(12) United States Patent
Stowe

(10) Patent No.: US 7,302,972 B1
(45) Date of Patent: Dec. 4, 2007

(54) THERMO-INSULATED FLEXIBLE TUBING

(76) Inventor: Alan D. Stowe, 109 Kiowa Ct., Rosharon, TX (US) 77583

( * ) Notice: Subject to any disclaimer, the term of this patent is extended or adjusted under 35 U.S.C. 154(b) by 141 days.

(21) Appl. No.: 11/197,212

(22) Filed: Aug. 5, 2005

(51) Int. Cl.
*F16L 11/00* (2006.01)

(52) U.S. Cl. .................. 138/109; 138/112; 138/114; 138/117; 138/148; 285/332.4; 285/405

(58) Field of Classification Search .............. 138/109, 138/112, 114–117, 148; 285/332.4, 405
See application file for complete search history.

(56) References Cited

U.S. PATENT DOCUMENTS

| | | | | |
|---|---|---|---|---|
| 2,002,470 A | * | 5/1935 | Cornell, Jr. ............ 29/890.149 |
| 2,857,931 A | | 10/1958 | Lawton | |
| 3,379,221 A | * | 4/1968 | Harry et al. ................ 138/148 |
| 3,464,450 A | * | 9/1969 | Francesco ................... 138/113 |
| 3,992,045 A | * | 11/1976 | Whittell et al. ............. 285/371 |
| 4,005,234 A | | 1/1977 | Stroupe | |
| 4,157,194 A | * | 6/1979 | Takahashi ....................... 285/3 |
| 4,307,756 A | | 12/1981 | Voigt et al. | |
| 4,906,496 A | * | 3/1990 | Hosono et al. ............ 428/36.9 |
| 5,186,502 A | * | 2/1993 | Martin ..................... 285/123.1 |
| 5,423,353 A | * | 6/1995 | Sorensen .................... 138/109 |
| 5,456,502 A | * | 10/1995 | Sharp ....................... 285/123.1 |
| 5,497,809 A | * | 3/1996 | Wolf .......................... 138/113 |
| 5,628,532 A | * | 5/1997 | Ashcraft ................ 285/123.15 |
| 5,722,462 A | | 3/1998 | Dridi et al. | |
| 5,746,255 A | * | 5/1998 | Walsh et al. ................ 138/115 |
| 6,116,290 A | * | 9/2000 | Ohrn et al. ................. 138/149 |
| 6,405,974 B1 | * | 6/2002 | Herrington ............... 242/609.4 |
| 2003/0005971 A1 | | 1/2003 | Dewimille et al. | |
| 2003/0150504 A1 | | 8/2003 | Simon et al. | |

\* cited by examiner

*Primary Examiner*—James Hook

(57) ABSTRACT

A water supply line includes a cylindrical and ductile outer tube that has a centrally aligned axis. An inner tube is concentrically spaced about the axis of the outer tube and has a length coextensively sized therewith. The inner tube is equidistantly spaced inward from the outer tube, defining a cavity therebetween. Fingers are intercalated between the inner and outer tubes and seated within the cavity. The fingers extend outward from the inner tube and are positioned along the entire length of the tubes, defining isolated air chambers which act as a thermal blanket, preventing cold air from passing into and hot air from exiting the inner tube. A coupling is provided with a bore and is in fluid communication with the inner tube and conjoinable therewith. The coupling has an outer surface provided with barbs such that the coupling can be connected to the inner tube.

4 Claims, 1 Drawing Sheet

THERMO-INSULATED FLEXIBLE TUBING

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to flexible tubing and, more particularly, to thermo-insulated flexible tubing for insulating a flow of water in extreme weather conditions.

2. Prior Art

People living in areas where ambient temperatures have a tendency reach either cold or warm extremes at some point during the year, are quite familiar with the problems associated with tubes and pipes that carry water. In areas where extreme cold temperatures are encountered, one must frequently deal with frozen water in the pipe lines and tubing of structures. This is inconvenient since access to water is limited and the chemical properties of water cause the water to expand upon freezing, which can lead to burst pipes and tubes. Obviously, it can become quite expensive to annually replace broken pipes and tubes.

On the other end of the spectrum, there are the problems associated with extremely high ambient temperatures. Cold water carried in tubes and pipes in these areas have a tendency to become over heated and not suitable for use. The metal tubes and pipes used also have a tendency to expand in extreme heat, thus diminishing the effective water flow rate. This can make showers and watering one's garden quite an inconvenient experience, since a greater amount of time is needed to dispense the needed amount of water. As such, insulated tubing and pipes have been introduced to the prior art.

One example discloses a thermally insulated tube construction which includes a metal tube, and a metal ribbon coaxially enveloping the tube and being spaced therefrom by synthetic foam. In particular, a foam on the basis of polyisocyanurate is used which has been made flame resistant. Also, the metal ribbon is coated with a flame-resistant copolymer. The foil or metal ribbon formed into an outer tube serves as a kind of mold. Upon forming this tube, the edges of the foil are folded up, resulting in a radially outwardly extending and cemented tab which is subsequently folded down onto the surface of this tube.

This known tube is quite expensive to make, and the foil edges and tab are highly visible. Moreover, the tube just barely meets flame-resistant standards as and then only in the beginning. Sooner or later, the flame-resistant additives diffuse more or less rapidly out of the foam, so that the actually provided protection lasts only temporarily. Moreover, the known flame-retarding additives which are included in the foam can also frequently act as a softener, thereby interfering with the spacing and support function of the insulation. The insulation foam also becomes thermally instable in some cases.

Accordingly, a need remains for a thermo-insulated flexible tubing in order to overcome the above-noted shortcomings. The present invention satisfies such a need by providing thermo-insulated tubing that is efficient in its designed function, inexpensive to produce and easy to install. The air gap between the two layers provides a good level of thermal insulation, thereby making it resistant to freezing and helps to minimize heat loss through the water lines. Such thermo-insulated tubing further eliminates the need to apply foam insulation about the tube, thus saving a considerable amount of time and energy.

BRIEF SUMMARY OF THE INVENTION

In view of the foregoing background, it is therefore an object of the present invention to provide thermo-insulated flexible tubing. These and other objects, features, and advantages of the invention are provided by a potable water supply line for insulating a flow of water in extreme weather conditions.

The water supply line includes an outer tube formed from ductile material and has a cylindrical shape. Such an outer tube further has a centrally aligned longitudinal axis extending along an entire length thereof. The outer tube may be formed from flexible and non-resilient material. Such flexible and non-resilient material is reactive to heat in such a manner that a selected portion of the water supply line can effectively be adapted between 45 and 90 degrees after being heated to a predetermined temperature. The outer tube conveniently maintains the adapted shaped after cooling down to an ambient temperature.

An inner tube is concentrically spaced about the axis of the outer tube. Such an inner tube has a longitudinal length coextensively sized with the longitudinal length of the outer tube. The inner tube further has a diameter suitably sized and shaped such that the inner tube is equidistantly spaced inward from the outer tube and defines a cavity intercalated between the inner and outer tubes such that the inner and outer tubes can maintain a fixed spatial relationship while the outer tube is maintained at a linear shape. The inner tube may be formed from expandable material such that the inner tube can expand and contract when hot and cold water is passed therethrough.

A plurality of linear fingers are intercalated between the inner and outer tubes and seated within the cavity. Such fingers radially extend outward from the inner tube and are equidistantly spaced along an outer perimeter of the inner tube and positioned along the entire longitudinal length of the inner and outer tubes. The fingers are preferably coextensively shaped and formed to be substantially rigid such that the inner and outer tubes are statically maintained along a linear path. The fingers define a plurality of isolated air chambers which advantageously act as a thermal blanket. Such isolated air chambers effectively and advantageously prevent undesirable cold ambient air from passing into the inner tube and further prevents desirable hot air from exiting out of the inner tube during operating conditions.

A coupling is provided with an axial bore. Such a coupling is directly conjoinable with the water supply line. The coupling is in fluid communication with the inner tube and conjoinable therewith for conveniently and effectively allowing the operator to mate the water supply line with an auxiliary line. Such a coupling has an outer surface provided with a plurality of monolithically formed barbs suitably sized and shaped such that the coupling can be thermally and permanently connected directly to the inner tube by heating the coupling and the water supply line to a predetermined temperature.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
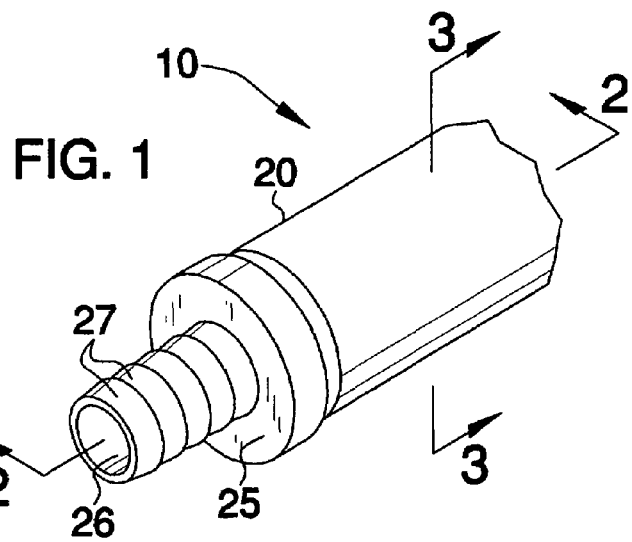
FIG. 1 is a perspective view showing thermo-insulated flexible tubing, in accordance with the present invention.
Figure 2:
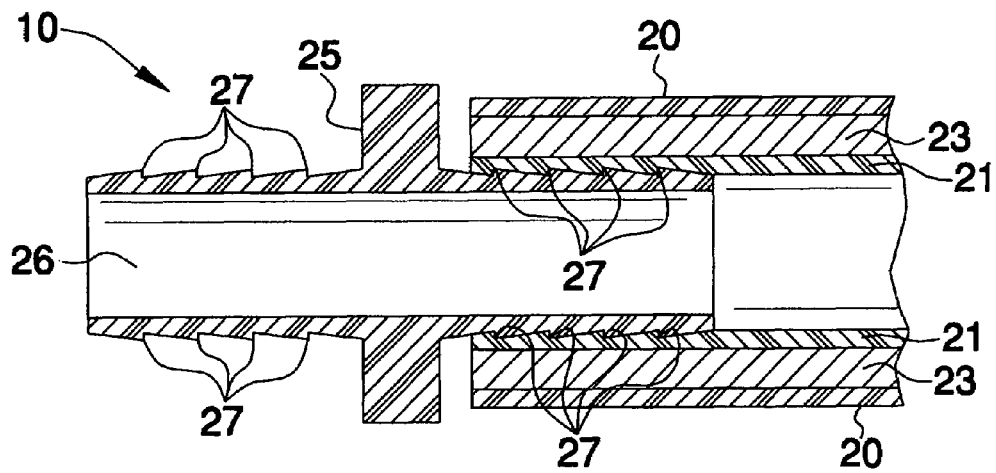
FIG. 2 is a cross-sectional view of the apparatus shown in FIG. 1, taken along line 2-2 and showing the coupling barbs connected to the inner tube.
Figure 3:
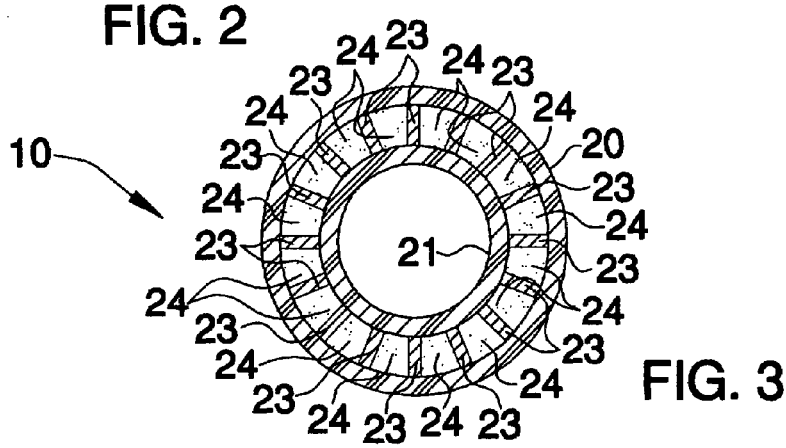
FIG. 3 is a cross-sectional view of the apparatus shown in FIG. 1, taken along line 3-3 and showing the fingers forming the isolated air chambers.

The apparatus of this invention is referred to generally in FIGS. 1-3 by the reference numeral 10 and is intended to provide thermo-insulated flexible tubing. It should be understood that the apparatus 10 may be used to insulate many different types of tubing and should not be limited in use to only flexible tubing.

Referring initially to FIG. 1, the apparatus 10 includes an outer tube 20 formed from ductile material and has a cylindrical shape. Such an outer tube 20 further has a centrally aligned longitudinal axis extending along an entire length thereof. The outer tube 20 is formed from flexible and non-resilient material, thus conveniently allowing same to be adapted to various shapes. Such flexible and non-resilient material is reactive to heat in such a manner that a selected portion of the water supply line 10 can effectively be adapted between 45 and 90 degrees after being heated to a predetermined temperature, which is critical for allowing the water supply line 10 to be placed around corners. The outer tube 20 conveniently maintains the adapted shaped after cooling down to an ambient temperature so that constant reshaping thereof is not required.

Referring to FIGS. 2 and 3, an inner tube 21 is concentrically spaced about the axis of the outer tube 20. Such an inner tube 21 has a longitudinal length coextensively sized with the longitudinal length of the outer tube 20, which is essential for ensuring continuous water flow along the water supply line 10. The inner tube 21 further has a diameter suitably sized and shaped such that the inner tube 21 is equidistantly spaced inward from the outer tube 20 and defines a cavity 22 intercalated between the inner 21 and outer 20 tubes such that the inner 21 and outer 20 tubes can maintain a fixed spatial relationship while the outer tube 20 is maintained at a linear shape. The inner tube 21 is formed from expandable material such that the inner tube 21 can expand and contract when hot and cold water is passed therethrough, which is critical and advantageous for preventing the inner tube 21 from cracking or bursting. Of course, the outer 20 and inner 21 tubes may be produced to have a variety of different shapes, sizes and diameters, as is obvious to a person of ordinary skill in the art.

Still referring to FIGS. 2 and 3, a plurality of linear fingers 23 are intercalated between the inner 21 and outer 20 tubes and seated within the cavity 22. Such fingers 23 radially extend outward from the inner tube 21 and are equidistantly spaced along an outer perimeter of the inner tube 21 and positioned along the entire longitudinal length of the inner 21 and outer 20 tubes. Of course, the fingers 23 may be alternately positioned about the inner tube 21, such as being positioned concentrically about it, as is obvious to a person of ordinary skill in the art. The fingers 23 are coextensively shaped and formed to be substantially rigid, which is important such that the inner 21 and outer 20 tubes are statically maintained along a linear path. The fingers 23 define a plurality of isolated air chambers 24 which advantageously act as a thermal blanket. Such isolated air chambers 24 are crucial for effectively and advantageously preventing undesirable cold ambient air from passing into the inner tube 21 and further preventing desirable hot air from exiting out of the inner tube 21 during operating conditions. This ensures that the water flowing through the inner tube 21 does not become frozen while also preventing the hot waterlines from becoming excessively cold, which would require the water heater to function more often than is necessary.

Referring FIGS. 1 and 2, a coupling 25 is provided with an axial bore 26. Such a coupling 25 is directly conjoinable, with no intervening elements, with the water supply line 10. The coupling 25 is in fluid communication with the inner tube 21 and conjoinable therewith, which is crucial for conveniently and effectively allowing the operator to mate the water supply line 10 with an auxiliary line (not shown). Such a coupling 25 has an outer surface provided with a plurality of monolithically formed barbs 27 suitably sized and shaped such that the coupling 25 can be thermally and permanently connected directly, with no intervening elements, to the inner tube 21 by heating the coupling 25 and the water supply line 10 to a predetermined temperature. This advantageously ensures that no water will leak from the water supply line 10 at the connection point, while also providing adequate insulation at this point.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A potable water supply line for insulating a flow of water in extreme weather conditions, said water supply line comprising:

an outer tube formed from ductile material and having a cylindrical shape, said outer tube further having a centrally aligned longitudinal axis extending along an entire length thereof;

an inner tube concentrically spaced about the axis of said outer tube, said inner tube having a longitudinal length coextensively sized with the longitudinal length of said outer tube, said inner tube having a diameter suitably sized and shaped such that said inner tube is equidistantly spaced inward from said outer tube and defines a cavity intercalated between said inner and outer tubes such that said inner and outer tubes can maintain a fixed spatial relationship while said outer tube is maintained at a linear shape;

a plurality of linear fingers intercalated between said inner and outer tubes and seated within the cavity, said fingers radially extending outward from said inner tube and equidistantly spaced along an outer perimeter of said inner tube and positioned along the entire longitudinal length of said inner and outer tubes;

wherein said fingers define a plurality of isolated air chambers which act as a thermal blanket, said isolated air chambers preventing undesirable cold ambient air from passing into said inner tube and further preventing desirable hot air from exiting out of said inner tube during operating conditions; and a coupling provided with an axial bore, said coupling being directly conjoinable with said water supply line, said coupling being in fluid communication with said inner tube and conjoinable therewith for allowing the operator to mate said water supply line with an auxiliary line;

wherein said coupling has an outer surface provided with a plurality of monolithically formed barbs suitably sized and shaped such that said coupling can be thermally and permanently connected directly to said inner tube by heating said coupling and said water supply line to a predetermined temperature;

wherein said coupling comprises an outwardly flanging shoulder concentrically spaced about a medial portion of said coupling such that said coupling has coextensively shaped proximal and distal ends axially extending away from said shoulder and defining an entire longitudinal length of said axial bore.

2. The water supply line of claim 1, wherein said outer tube is formed from flexible and non-resilient material, a selected portion of said water supply line being adapted between 45 and 90 degrees when heated to a predetermined temperature, said outer tube maintaining the adapted shaped after cooling down to an ambient temperature.

3. The water supply line of claim 1, wherein said fingers are coextensively shaped and formed to be substantially rigid such that said inner and outer tubes are statically maintained along a linear path.

4. The water supply line of claim 1, wherein said inner tube is formed from expandable material such that said inner tube can expand and contract when hot and cold water is passed therethrough.

* * * * *